United States Patent [19]

Takenaga

[11] 4,132,391

[45] Jan. 2, 1979

[54] MEANS FOR FORMING A STRUCTURE OF AN OPTIONAL CURVE

[76] Inventor: Senzo Takenaga, c/o Akebono Kikai Kabushiki Kaisha, Taura Minato-Machi, Yokosuka-shi, Kanagawa-ken, Japan

[21] Appl. No.: 863,142

[22] Filed: Dec. 21, 1977

[51] Int. Cl.² ............................................ E04B 17/14
[52] U.S. Cl. ........................................ 256/59; 52/187; 256/65
[58] Field of Search ............... 256/59, 21, 65; 52/187, 52/730, 731

[56] References Cited

U.S. PATENT DOCUMENTS

| 3,332,179 | 7/1967 | Toti | 52/731 |
| 3,357,681 | 12/1967 | Souza | 256/65 |
| 3,733,055 | 5/1973 | Hughes | 256/59 |
| 3,999,335 | 12/1976 | Nagy | 52/730 |

Primary Examiner—John E. Murtagh
Attorney, Agent, or Firm—Michael J. Striker

[57] ABSTRACT

The present invention relates to means for forming a structure of an optional curve such as a smooth spiral or the like, and more particularly means for forming a structure of a plane curve such as circle or ellipse or the like, or a cubic curve such as spiral ascending with a constant pitch. The structure of an optional curve is applicable to the handrails of the spiral stairs of building, or the rails of various curve in ships, flower beds and/or the like.

7 Claims, 6 Drawing Figures

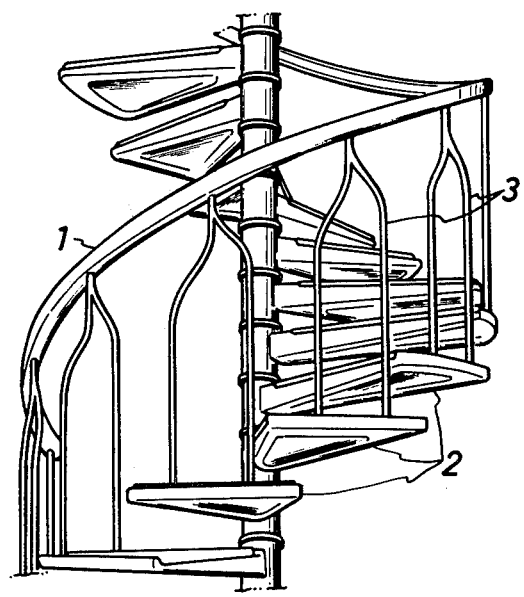
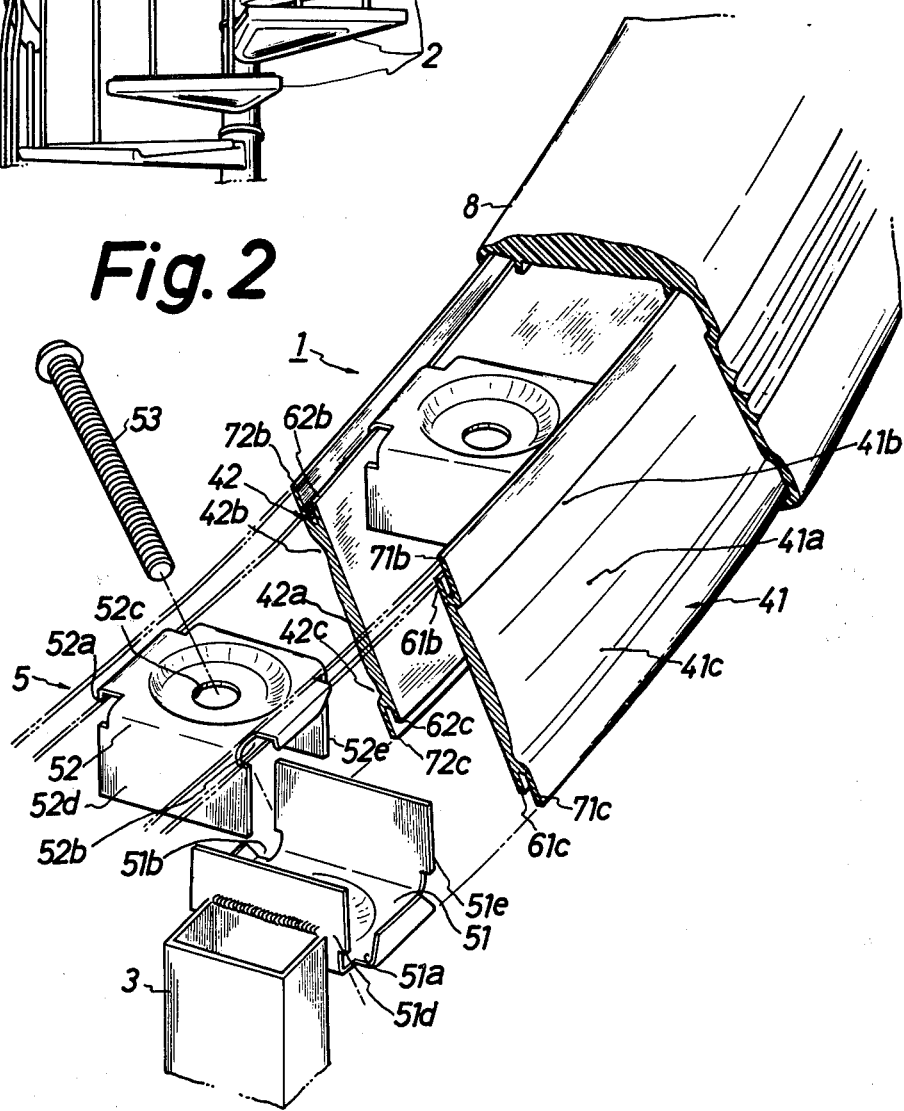

MEANS FOR FORMING A STRUCTURE OF AN OPTIONAL CURVE

BACKGROUND OF THE INVENTION

Spiral stairs of building have the functional feature for utilizing its space effectively as well as the design effect for attracting the beauty of building.

In view of the design of the spiral stairs, a handrail body thereof must be provided with a beautiful view. By forming a curve of the handrail more smoothly, the beauty of building is enhanced furthermore.

In view of the design, such handrails of conventional art have many disadvantages to be improved. The conventional handrails for the spiral stairs are made of pipe or steel rod which is to be bent in relation to the ascent of the spiral stairs as well as the spiral curve thereof. And it is a difficult technical task to form a smooth curve of the handrail which is an inconspicuous element.

Further, since the pipes or steel rods for the conventional handrails for the spiral stairs are bent at the site of building construction, its working is very burdensome, uneasy in assembling and welding, and subsequently expensive in cost. In the same manner, it becomes a very difficult technical subject to obtain a smooth curve of the handrails in flower beds, ships and other various fields.

In order to remove the aforegoing disadvantages of the conventional art, the present invention has been achieved.

BRIEF SUMMARY OF THE INVENTION

It is an object of this invention to provide means for forming a structure of an optional curve which is applicable to the spiral stairs of building, flower beds, ships and other various fields, whereby a preferred smooth curve of the structure can be obtained.

It is another object of this invention to provide means for forming a structure of an optional curve, which can be manufactured and assembled easily.

It is further of object of this invention to provide means for forming a structure of an optional curve such as spiral or the like in order to enhance furthermore the beauty of the spiral stairs of building, flower bed, ship, etc.

Other and further objects, features and advantages of the invention will appear more fully from the following description.

The features of this invention will be summarized as follows.

1. Means for forming a structure of an optional curve comprises mainly a pair of rails of band plate and a plurality of binding fittings mounted therebetween to a longitudinal direction of the handrails and binding the curvature thereof.

2. The binding fittings have a pair of binding members, i.e. an upper binding member and a lower binding member, and a bolt for clamping the two binding members.

3. Further, in order to obtain a spiral or cubic curve, when the binding fittings are mounted between the two handrails of band plate, the angle of each of the side portions of the two binding members in relation to the normal line forming the right angle toward a longitudinal direction of the handrails is set so as to be equivalent to the ascending angle of the spiral stairs.

BRIEF DESCRIPTION OF THE DRAWING

FIG. 1 is a perspective view of means for forming a structure of an optional curve according to this invention, which is applied to a spiral stairs handrail.

FIG. 2 is a perspective view of a handrail body showing an embodiment of this invention.

DETAILED DESCRIPTION OF THE INVENTION

Figure 3:
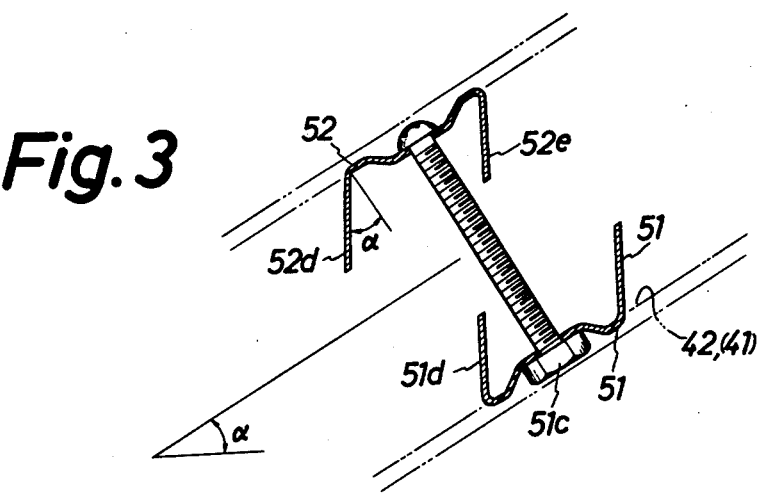
FIG. 3 is a sectional side elevation of the embodiment in FIG. 2 wherein binding fittings for binding two handrails are mounted therebetween.

In reference to the accompanying drawings, an embodiment of this invention will be described hereinafter.

Referring first to FIG. 1 which shows a complete unit of spiral stairs to which a handrail body 1 is applied, the handrail body 1 is mounted on the top of each of stands 3 for supporting it, and is provided with a smooth curve. A plurality of stands are standing at the side end of a plurality of steps 2.

Referring to FIG. 2 which shows the structure of the handrail body 1, it comprises mainly a pair of handrails 41, 42 of band plate formed in parallel with each other, and a plurality of binding fittings mounted therebetween to a longitudinal direction of the handrails 41, 42 and binding the curvature thereof. Preferably, the material of the handrails 41, 42 is made of aluminum or its alloy having properties of anti-corrosion whereby the handrail body 1 is able to be assembled easily. The center portions 41a, 42a of the handrails 41, 42 are thicker than the upper portions 41b, 42b of and the lower portions 41c, 42c of the handrails 41, 42. Accordingly, the handrails 41, 42 have the shape advantageous to describe a spiral curve. Further, the upper portions 41b, 42b of and the lower portions 41c, 42c of the handrails 41, 42 are of bifurcated shape. The inner projections 61b, 61c, 62b, 62c of the bifurcated portion are lower than the outer projections 71b, 71c, 72b, 72c thereof. Accordingly, the formers 61b, 61c, 62b, 62c are hidden behind the latters 71b, 71c, 72b, 72c. This is a preferred thing in view of mounting of the cover unit 8 which will be described hereinafter, as well as in view of the external apperance of the handrail body 1. The inner projections 61b, 61c, 62b, 62c of the handrails 41, 42 are engaged with the guiding paths 51a, 51b, 52a, 52b of the binding members 51, 52 which will be described hereinafter.

The binding fittings 5 comprise a pair of binding members 51, 52 which are mounted at the upper and lower side and two side ends of the two binding members having the guiding paths 51a, 51b, 52a, 52b. And a clamping bolt 53 is inserted from the center hole 52c of the upper binding member 52 into the center hole (not illustrated) of the lower binding member 51, and screwed with a nut 51c which is to be fixed on the underside of the binding member 51. Thus, the two binding members 52, 51 are firmly linked with each other by clamping the bolt 53, whereby the binding fittings comprising the two binding members 52, 51 and the bolt 53 are mounted between the two handrails 41, 42.

FIG. 3 is a sectional side elevation of the handrail body 1 in which the binding fittings 5 are mounted between the handrails 41, 42. The angle α of each of the handrails 41, 42 in relation to the horizontal surface is equivalent to the ascending angle of the spiral stairs. Particularly, it should be noted that each inclination of the portions 51d, 51e, 52d, 52e of the upper and lower binding members 52, 51 is equivalent to the above angle α. In other words, the angle of each of the side portions 51d, 51e, 52d, 52e contacting the inner sides of the handrails 41, 42 in relation to the normal line forming the right angle toward a longitudinal direction of the handrails 41, 42 is set so as to be equivalent to the ascending angle of the spiral stairs. This is the most important condition to obtain a smooth spiral curve. If such condition is not obtained, when clamping the bolt 53 the side portions 51d, 51e, 52d, 52e will cause a certain distortion for the handrails 41, 42.

The assembling of the hand-rail body 1 will now be described.

The lower binding member 51 is mounted by welding or other means on each upper end of a plurality of stands 3 for the handrail body 1 which are standing along the side of the steps 2. Needless to say, it is possible to form the binding member 51 and the stand 3 as an integral element. Accordingly, a plurality of binding members 51 are provided with a certain space to an upwardly ascending direction of the spiral stairs. An assembler first of all has to insert the projections 61c, 62c of the handrails 41, 42 into the guiding paths 51a, 51b of a plurality of binding members 51. The handrails 41, 42 are not yet fixed with each other. Subsequently, the upper binding member 52 is mounted at the upper part of the handrails 41, 42, and the two binding members 52, 51 are firmly connected to each other by clamping the bolt 53. Thus, a pair of handrails 41, 42 are in parallel with each other fixed on each top of a plurality of stands 3. Thus, the assembling of the handrail body 1 is completely terminated by covering a vinyl chloride-made cover 8 on the two handrails 41, 42 having a parallel space with each other.

Figure 6:
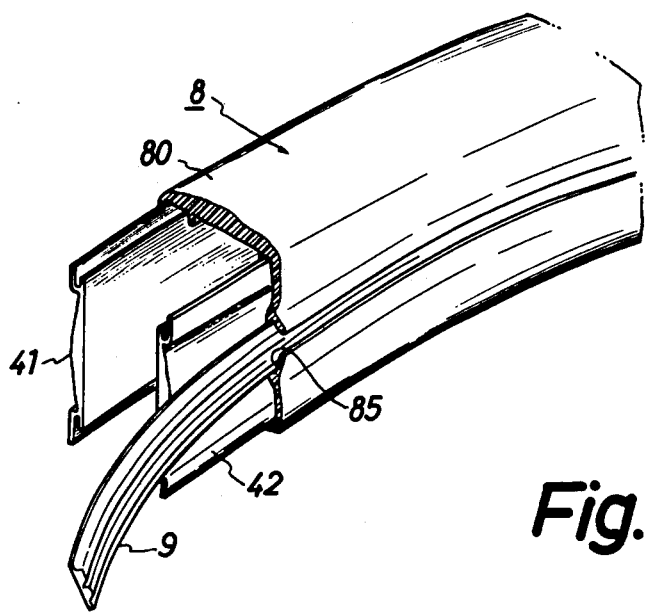
FIG. 6 is a perspective view showing the mounting condition of the cover body in FIG. 2.

Generally, the cover 8 for the handrails 41, 42 covers the two side portions and the top portion of the handrail body 1. As for the material of the cover 8, it is preferably made of vinyl chloride plastic. When it is mounted on the handrail body 1, there is the inconvenience that it is loosened on the handrail body 1. Even if the cover 8 covers both sides of the handrail body 1, it is difficult to fit to the external shape of the handrail body 1. From this point of view an ideal type of the cover 8 is illustrated in FIGS. 4 to 6.

Figure 4:
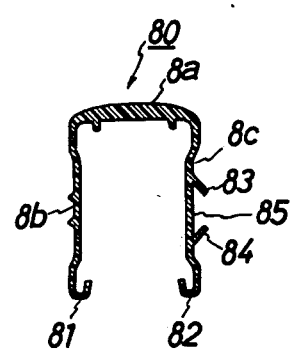
FIG. 4 is a section view of a cover body for covering the handrail body in FIG. 2.
Figure 5:
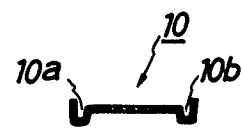
FIG. 5 is a section view of an additional cover for covering the handrail body in FIG. 2.

In FIG. 4 there is illustrated a section view of the cover body 80. As understood in FIG. 4, the cover body 80 is of a U-reverse shape in section. And the cover 80 has two hook-shaped members 81, 82 for mounting to the handrails 41, 42. It is to be understood that the thickness of a top surface 8a of the cover body 80 is thicker than that of an outer side 8b and an inner side 8a thereof. This is due to that a certain degree of rigidness is applied to the top surface 8a.

On the inner side 8c which is thinner than the top surface 8a a pair of flaps 83, 84 are faced inwardly with each other. The two flaps 83, 84 form a portion 85 for receiving a rigid member 9 together with part of the inner side 8c. The rigid member 9 is preferably made of a hard vinyl chloride material having a certain rigidity and resilience. In addition, it is required that the rigid member 9 is harder than the cover body 80. The shape of the rigid member 9 is not limited to a particular one as far as it can be inserted into the rigid member receiving portion 85. However, taking into consideration the function that the cover body 80 should have a sufficient tension, the curvature of the rigid member 9 is preferably to be set larger than that of the cover body 80. Further, the rigid member receiving portion 85 is preferably provided in the inner side of the handrail body 1.

The cover body 80 covers three faces of the handrail body 1 i.e. the outer side 8b, the inner side 8c and the top face 8a excluding the underside of the handrail body 1. Accordingly, an additional cover 10 of which section is shown in FIG. 6 can be mounted in order to cover the underside of the handrail body 1 if necessary.

The installation of the cover 8 covering the handrail body 1 mounted on the top of the stand 3 will now be described hereinafter. First, the additional cover 10 must be mounted. That is, two U-shaped hooks 10a, 10b of the additional cover 10 are engaged with the projections 71c, 72c of the handrails 41, 42. Subsequently, the cover body 80 is mounted on the handrail body 1. After another U-shaped hook 81 of the cover body 80 is engaged with the projection 71c of the handrail 41, the other U-shaped hook 82 is engaged with the projection 72c of the handrail 42. Thus, the mounting of the cover body 80 is terminated. In order to make this mounting possible, the cover body 80 is set to become a bit larger. In addition, the cover body 80 has flexibility, and when it is mounted on the handrails 41, 42 it has no sufficient tension. Therefore, after the mounting of the cover body 80 the rigid member 9 is to be inserted into the rigid member receiving portion 85 of the inner side of the cover body 80 so that the cover body 80 covering the handrail body 1 can obtain a sufficient tension. Thus the mounting of the cover 8 is completed.

In the above embodiment the inner projections 61b, 61c, 62b, 62c to be engaged with the guiding paths 51a, 51b, 52a, 52b of the binding members 51, 52 are provided at the inner side of the rails 41, 42, but the outer projections 71b, 71c, 72b, 72c of the rails 41, 42 can be used as guiding means.

As obviously understood in the foregoing description, since the structure (such as the spiral stairs) of an optional curve according to this invention comprises a pair of rails of band plate and a plurality of binding fittings mounted therebetween, a preferred smooth curve is obtainable by bending the rails. In addition, due to the band plate shape of the rails the curve line thereof is very outstanding, and the beauty of the building having such the curved rails is enhanced furthermore. In this case, since the inclination of the side portions of the binding members of the binding fittings is bent so as to correspond to the ascending angle of the curved structure such as the spiral stairs, a plurality of binding fittings are firmly fixed with the rails with no excessive force. Accordingly, the rails can describe a smooth curve line. Further, the binding members are mounted to the rails due to the mutual engagement without any welding. Accordingly, a structure of an optional curve can be assembled easily.

What is claimed is:

1. Means for forming a structure of an optional curve, comprising a pair of rails of band plate to be provided with a parallel space, and a plurality of binding fittings mounted to a longitudinal direction between a pair of rails and restricting the curvature of a pair of rails, each binding fittings having an upper binding member and a lower binding member each of which has two guiding paths at the side end thereof and has the same shape, and having a clamping bolt for clamping said two binding members, said guiding paths of said binding member being engaged with the upper and lower ends of said two rails or with inner projections to be provided adjacent said upper and lower ends, each binding fittings being able to be clamped by said clamping bolt, whereby when mounting said two binding members between said two rails, the angle of each side portion of said binding member in relation to the normal line forming the right angle toward a longitudinal direction of said rails is set to be equivalent to the ascending angle of said structure of an optional curve.

2. Means for forming a structure of an optional curve claimed in claim 1, wherein the center portion of a pair of rails is thicker than respective upper and lower portion thereof.

3. Means for forming a structure of an optional curve claimed in claim 1, wherein a pair of rails are made of aluminum or aluminum alloy.

4. In means for forming a structure of an optional curve, a handrail body for spiral stairs comprising a pair of handrails of band plate, and a plurality of stands standing at one side of said spiral stairs, wherein a first binding member having two guiding paths at both sides of said first binding member is mounted on each stand, said guiding paths of said first binding member being engaged with the lower ends of said handrails of band plate or with the inner projections to be provided adjacent said lower ends, while a second binding member of the same shape as said first binding member having two guiding paths at both sides of said second binding member is mounted at the upper part of said handrails, said guiding paths of said second binding member being engaged with the upper ends of said handrails or with the inner projections to be provided adjacent said upper ends, said handrails being provided with a parallel space by clamping said two binding members with a clamping both and being covered by a cover, consequently when mounting said two binding members between said handrails the angle of each side portion of said binding member in relation to the normal line forming the right angle toward a longitudinal direction of said handrails being set to be equivalent to the ascending angle of said handrails.

5. A handrail body for spiral stairs claimed in claim 4, said guiding paths of said binding member are engaged with the inner projections of said handrail upper and lower ends, said inner projections being lower than the outer projections.

6. In a handrail body for spiral stairs claimed in claim 4, a cover body for a handrail body comprising a flexible cover for covering the inner, outer and top portion of said handrail, a rigid member receiving portion provided at one side of said cover to a longitudinal direction of said handrail, and a rigid member to be inserted into said portion.

7. In a handrail body for spiral stairs claimed in claim 6, a cover body for a handrail body wherein a rigid member receiving portion is provided at the inner side of said handrail, the curvature of said rigid member being larger than said handrail.

* * * * *